No. 639,986. Patented Dec. 26, 1899.
E. ISBILLS.
DEVICE FOR MENDING PNEUMATIC TIRES.
(Application filed Sept. 22, 1899.)
(No Model.)
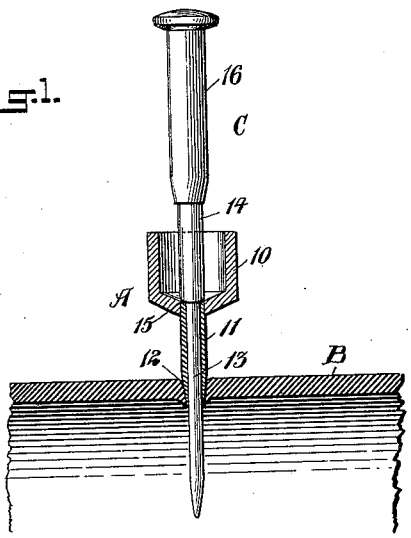
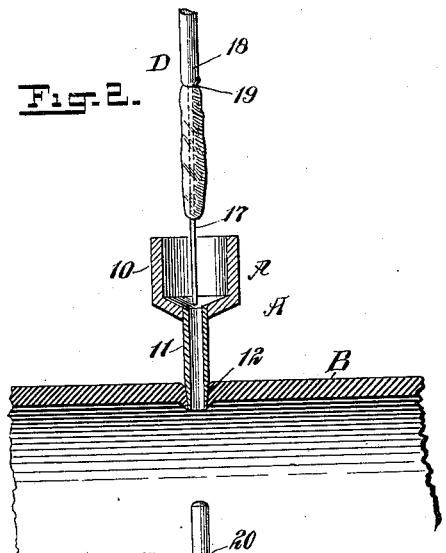
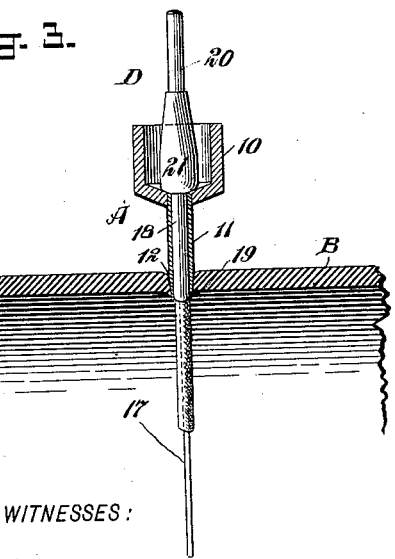
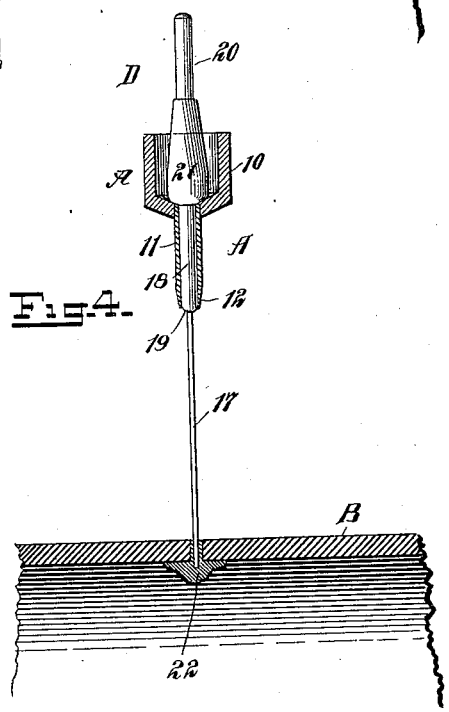
WITNESSES:
INVENTOR
BY
ATTORNEYS

UNITED STATES PATENT OFFICE.

EDMOND ISBILLS, OF BAYONNE, NEW JERSEY.

DEVICE FOR MENDING PNEUMATIC TIRES.

SPECIFICATION forming part of Letters Patent No. 639,986, dated December 26, 1899.

Application filed September 22, 1899. Serial No. 731,285. (No model.)

*To all whom it may concern:*

Be it known that I, EDMOND ISBILLS, of Bayonne, in the county of Hudson and State of New Jersey, have invented a new and Improved Device for Mending Pneumatic Tires, of which the following is a full, clear, and exact description.

The object of the invention is to provide a simple device whereby any person of ordinary intelligence may speedily and conveniently close a puncture in a pneumatic tire and immediately thereafter inflate the tire to its full capacity.

Another object of the invention is to provide tools for accomplishing the above-named result which will be simple, durable, and economic and which will need but little space for storage.

A further object of the invention is to provide a mending device for pneumatic tires so constructed that rubber cement or other adhesive material may be introduced through a puncture into the tire in such manner that when the device is withdrawn from the tire the puncture will be immediately filled with the cementing material and the body of the cementing material will be left in the form of a cap or head adhering to the inner surface of the tire around and over the puncture.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a vertical section through the guide of the improved device and a portion of the tire into which the guide is introduced, a needle adapted for fixing the guide in the tire being shown in side elevation. Fig. 2 is a vertical section through the guide and a portion of the tire and a side elevation of a portion of the needle adapted to introduce the cementing material through the guide into the tire. Fig. 3 is a view similar to Fig. 2, showing the cementing-needle as having been passed through the guide and into the tire; and Fig. 4 is a vertical section through a portion of the tire and the guide and a side elevation of the cementing-needle, illustrating the guide as withdrawn from the tire and the needle as being partially withdrawn and showing the manner in which the cement is formed into a head within the tire, across and around a puncture therein.

The device comprises practically three parts—a guide-cup A, a fixing-needle C, and a cementing-needle D. The guide-cup consists of a body 10, having an inclined bottom surface with an opening therein in communication with a tubular shank 11, the lower or outer end 12 of which tubular shank is exteriorly tapered, so that its lower extremity is more or less sharp, in order that the shank may be readily introduced into a puncture in an inflatable or pneumatic tire B.

The needle C is employed for fixing the guide-cup in the tire, and said needle consists of a body 13, a head 14 of greater diameter than the body, thus providing a shoulder 15, and a handle 16. The body 13 of the needle is of such diameter that it may be readily passed through the tubular shank of the guide-cup and yet substantially fill the chamber of said shank, and the body 13 of the needle is, furthermore, of such length that when the shoulder 15 of the head 14 engages with the bottom of the body 10 of the cup A the tapering or pointed end of the body 13 of the needle will extend some distance beyond the tapering end of the cup-shank 11, as shown in Fig. 1.

When a puncture has been discovered in a tire, the needle is passed through the shank 11 of the cup A and the pointed end of the needle is passed through the puncture, and as the body of the needle is carried within the tire the shank of the guide-cup A is conveniently made to enter the aperture, as shown in Fig. 1. After the guide-cup A is in position in the tire, as illustrated in Fig. 2, the cementing-needle D is brought into operation. The cementing-needle D consists of a body 17, which is of less diameter than the diameter of the shank 11 of the guide-cup, as shown in Figs. 2, 3, and 4. The body 17 of the cementing-needle connects with a head 18 of greater diameter than the body, forming a bottom shoulder 19, and the diameter of the head 18 of the cementing-needle corresponds practically to the inner diameter of the shank 11 of the guide-cup and is substantially of the same length as the said shank, as is shown in said Figs. 3 and 4. The cementing-needle is completed by the addition of a handle 20, having an offset 21 where the handle connects with the head 18, and when the head 18 of the cementing-needle is wholly within the shank 11 of the guide-cup the offset 21 of the handle of the needle will engage with the bottom of the body 10 of the guide-cup.

In continuing the operation of the device, the guide-cup being in position in the tire, the body 17 of the cementing-needle is drawn through or in contact with a rubber cement or cement of other character, the needle being meanwhile turned, so that the cement will be gathered around the said needle in suitable volume, care being taken that the cement on the body of the needle extends to the shoulder 19. The body of the needle, with the cement carried thereby, is passed down through the guide-cup into the tire B, as shown in Fig. 3, and when the cementing-needle has been properly seated in the guide-cup the cementing-needle is slowly withdrawn, and the guide-cup is withdrawn with the needle, care being taken to keep the needle seated in the guide-cup as the needle is drawn out from the tire. Since the cementing material engages with the shoulder 19 of the cementing-needle and this shoulder is just within the tire, when the cementing-needle and guide-cup are withdrawn the cement at the shoulder of the needle will enter the puncture or space formerly occupied by the bottom of the guide-cup and will fill the same. As the needle and guide-cup are further withdrawn the bulk of the cement carried by the needle will form into a head or a disk 22 on the inner face of the tire B around the puncture and across the same, as shown in Fig. 4.

It is evident that the tire may be immediately inflated after the cement has been placed in position, as the air in the tire will serve to quickly dry the cement and to force it, if possible, into better contact with the surface to which it is to adhere. Thus the cement is practically in the form of a rivet, including a shank located within the puncture and a head located within the tire at the point of puncture.

Having thus described my invention, I claim as new and desire to secure by Letters Patent—

1. A device for mending tires, consisting of a tubular guide having a shank portion adapted to enter a tire, and a needle adapted to carry cement and comprising a body of less diameter than the diameter of the shank portion of the guide, a head of greater diameter than the body and substantially of the same length as the shank portion of the guide, and an enlargement above the said head, for the purpose set forth.

2. A device for mending tires, consisting of a guide comprising a cup and a tubular shank and a needle adapted to carry cement and comprising a body of less diameter than the diameter of the shank of the guide-cup, a head of greater diameter than the body, the diameter of the head corresponding practically to the inner diameter of the shank of the guide-cup, and the said head being substantially of the same length as the shank, and a handle for said needle having an offset where the handle connects with the head, the said offset being adapted to engage with the bottom portion of the body of the guide-cup, substantially as shown and described.

3. In a device for mending tires, a tubular guide, a fixing-needle adapted to enter the guide and direct it into a puncture, and a cementing-needle adapted to enter the guide when the fixing-needle is withdrawn, the cementing-needle comprising a body of less diameter than the diameter of the guide, an enlargement on said body adapted to be seated within the guide, and a shoulder between the body and the offset or enlargement.

4. A device for mending tires, consisting of a guide comprising a cup and a tubular shank, a fixing-needle having a body adapted to extend through the shank of the cup, and an offset arranged for engagement with the bottom portion of the body of the cup, and a cementing-needle adapted to enter the guide-cup when the fixing-needle is withdrawn, the cementing-needle comprising a body of less diameter than the diameter of the shank of the guide-cup, a head of greater diameter than the body and of a length substantially equal to the length of the shank, together with an enlargement above the head, adapted to engage with the bottom portion of the body of the said guide-cup, as specified.

In testimony whereof I have signed my name to this specification in the presence of two subscribing witnesses.

EDMOND ISBILLS.

Witnesses:
W. F. O'NEILL,
GEO. F. MORITZ.